(12) United States Patent
Han et al.

(10) Patent No.: US 8,351,101 B2
(45) Date of Patent: Jan. 8, 2013

(54) PRINT SYSTEM AND METHOD TO PRINT SELECTED DATA AND CONTENT FROM A DOCUMENT

(75) Inventors: Yu-rim Han, Suwon-si (KR); Jae-kyoo Kang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1032 days.

(21) Appl. No.: 11/449,801

(22) Filed: Jun. 9, 2006

(65) Prior Publication Data

US 2006/0285163 A1 Dec. 21, 2006

(30) Foreign Application Priority Data

Jun. 17, 2005 (KR) .................. 10-2005-0052651

(51) Int. Cl.
*G06K 15/00* (2006.01)
*G06F 15/00* (2006.01)
(52) U.S. Cl. ........ 358/538; 358/1.2; 358/1.18; 358/528; 715/274; 715/856
(58) Field of Classification Search ............... 358/1.2, 358/1.18, 528, 538; 715/274, 856
See application file for complete search history.

(56) References Cited

U.S. PATENT DOCUMENTS

| | | | | |
|---|---|---|---|---|
| 5,428,459 A | * | 6/1995 | Asai | 358/449 |
| 6,411,400 B1 | * | 6/2002 | Mori | 358/1.2 |
| 6,628,415 B2 | * | 9/2003 | Lawrence et al. | 358/1.15 |
| 7,068,380 B2 | * | 6/2006 | Milton et al. | 358/1.13 |
| 2002/0080401 A1 | * | 6/2002 | Abe | 358/1.15 |
| 2002/0172425 A1 | * | 11/2002 | Venkatesan et al. | 382/229 |
| 2003/0147097 A1 | * | 8/2003 | Kotani et al. | 358/1.18 |
| 2003/0161003 A1 | * | 8/2003 | Herbert | 358/1.18 |
| 2004/0012814 A1 | * | 1/2004 | Tanaka et al. | 358/1.18 |
| 2004/0128612 A1 | * | 7/2004 | Dietl | 715/500 |

FOREIGN PATENT DOCUMENTS

| | | |
|---|---|---|
| JP | 5-46610 | 2/1993 |
| KR | 1999-26403 | 4/1999 |
| KR | 1999-43471 | 6/1999 |
| KR | 10-245023 | 11/1999 |
| KR | 10-299960 | 6/2001 |

* cited by examiner

*Primary Examiner* — Steven Kau
*Assistant Examiner* — Peter K Huntsinger
(74) *Attorney, Agent, or Firm* — Staas & Halsey LLP

(57) ABSTRACT

A system and method to select a print area to be printed from a document, to search the selected print area for blank areas, and to print and/or store the selected print area, having a size of the searched blank areas turned into a predetermined size or other space marker. Thus, the number of printed pages is reduced by printing only parts of documents in which there exists data for printout. Similarly, readability is improved, and comparison of data with other documents is facilitated. Further, a user can easily select certain content titles in a document for printing and/or storage while skipping underlying data content, and so on, so as to increase the user's satisfaction with printout results.

12 Claims, 8 Drawing Sheets

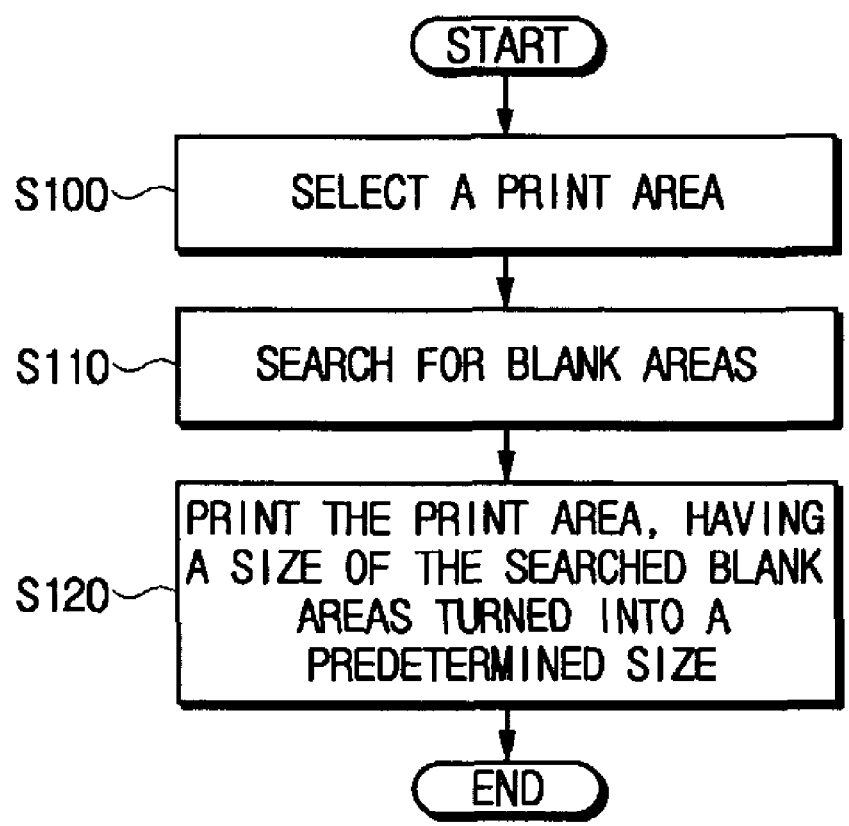

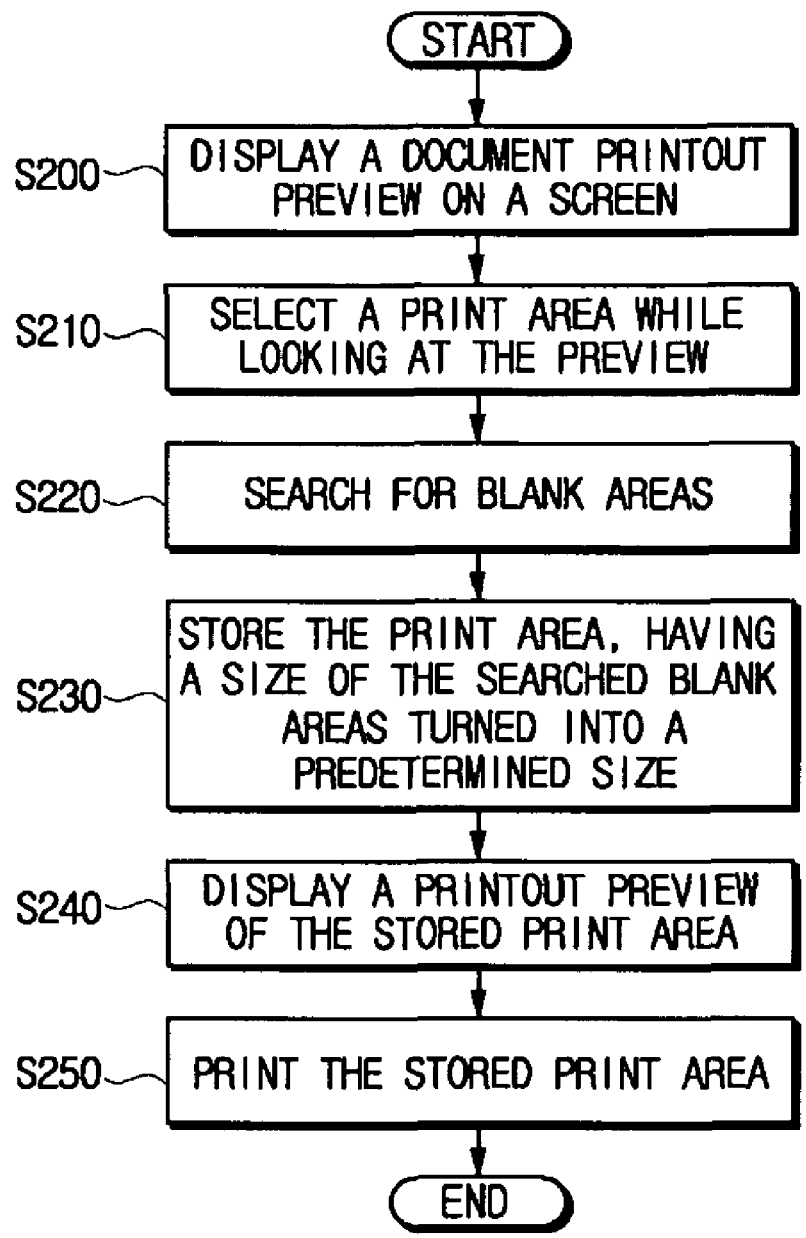

PRINT SYSTEM AND METHOD TO PRINT SELECTED DATA AND CONTENT FROM A DOCUMENT

CROSS-REFERENCE TO RELATED APPLICATIONS

This application claims benefit under 35 U.S.C. §119 from Korean Patent Application No. 2005-52651, filed on Jun. 17, 2005, the entire disclosure of which is incorporated herein by reference.

BACKGROUND OF THE INVENTION

1. Field of the Invention

Aspects of the present invention relate to a document printing system and a method of printing. Further, aspects of the present invention relate to a document print system and method capable of printing intended parts of data and content titles existing in a document as selected by a user.

2. Description of the Related Art

In order to create and print a document from an application program, a printer driver converts the document file into printer-interpretable commands, and compresses and sends data which will be printed (hereinafter, referred to as 'print data') to the serial port or parallel port through an input/output unit of a host computer. The printer receives the print data, decompresses the data received in its built-in memory, and prints the data.

Upon printing a document, the printer prints all pages in the document or all user-specified pages all the way through as they are. However, drawbacks of this conventional printing system and method are that when a user intends to print only data parts of a document or print only a specific part which is a selected area for printout, the user must expend additional effort since he or she has to directly edit a document, using an application program to achieve the desired result.

SUMMARY OF THE INVENTION

Aspects of the present invention have been developed in order to solve the above drawbacks and/or other problems associated with the conventional arrangement. An aspect of the present invention is to provide a document print system and a method capable of printing an intended print data part and content titles existing in a document depending on a user's option, so as to increase the user's satisfaction in the printed result.

Accordingly, aspects of the present invention provide a print method, comprising selecting a print area for printout from a document; searching the selected print area for blank areas; and printing the selected print area, having a size of the searched blank areas turned into a predetermined size. In an embodiment of the invention the blank areas are areas in which no data exists for printout.

In an embodiment of the invention, the operation of selecting the print area includes displaying on a screen a document printout preview to a user; and providing a print area selector in order for the user to select the print area while looking at the screen.

According to another aspect of the invention, selecting the print area further includes inputting the predetermined size of the converted blank areas.

According to another aspect of the invention, the print area selector is a mouse.

According to another aspect of the invention, the print area selector is a touch screen.

According to another aspect of the invention, the print area selector is an input window for inputting option values for specifying the print area, and an area defined by the option values is selected as the print area.

According to another aspect of the invention, the print operation includes storing the selected print area, with the size of the searched blank areas converted to the predetermined size; and printing the stored print area.

According to another aspect of the invention, the print operation includes displaying a printout preview of the stored print area before printing the stored print area.

Aspects of the present invention provide a print system, comprising a print area selection part to select a print area to be printed out of a document; a search part to search the selected print area for blank areas; a printer driver having a conversion part to convert the print area, having the size of the searched blank areas turned into a predetermined size; and a printer to print the print area converted by the conversion part. The blank areas are areas in which no data for printout exists.

In an embodiment of the invention, the print area selection part includes a preview viewer to display a document printout preview on a screen to a user; and a selection part to provide a print area selector enabling the user to select the print area while looking at the screen.

According to another aspect of the present invention, the print area selection part includes an input part for inputting the predetermined size.

According to another aspect of the present invention, the print area selector is an input window for inputting option values for specifying the print area, wherein an area defined by the option values is selected as the print area.

According to another aspect of the present invention, the print area selector is a mouse.

According to another aspect of the present invention, the print area selector is a touch screen.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a flow chart for describing a document print method according to an embodiment of the present invention;

FIG. 2 is a flow chart for describing a document print method according to another embodiment of the present invention;

DETAILED DESCRIPTION OF THE EMBODIMENTS

Figure 3A:
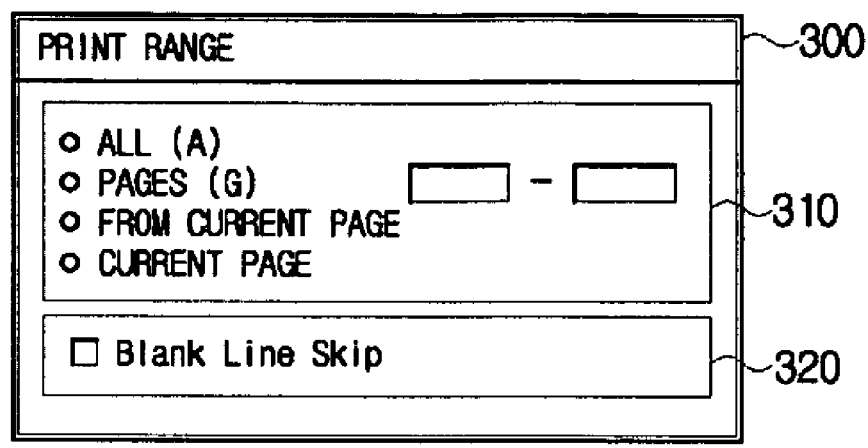
FIGS. 3A and 3B are views showing methods for selecting a print area according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a flow chart describing a document print method according to an embodiment of the present invention.

An operation S100 selects a print area to be printed out of a document. The print area can be the entire document, an entire page, a range of pages, parts of pages, and/or a part of a page of the document. The term "print area(s)" used in the present disclosure includes referring to an area to be searched for blank areas to be described later. The searches for blank areas are carried out on the parts selected as the print area. The print area can be selected as a user drags a mouse, manipulates a keyboard or remote controller, touches a touch screen or defines an area, using options of column, row, page, and so on. A user can select a print area on a document printout preview displaying a printout document before it is printed, according to an embodiment of the present invention. According to another embodiment, the user can select a print area after changing modes from the preview mode to a mode enabling the user to select the print area.

An operation S110 searches for blank areas in the print area selected in S100. The blank areas refer to those areas where text and figures do not exist.

An operation S120 prints the selected print area, having a size of the searched blank areas turned into a predetermined size. That is, the operation S120 prints the selected print area, having the predetermined size substituted for the size of the blank areas existing in the selected print area in S100. It is understood that the predetermined size can also be a predetermined data value such as a gird line or other marker indicator.

Figure 4A:
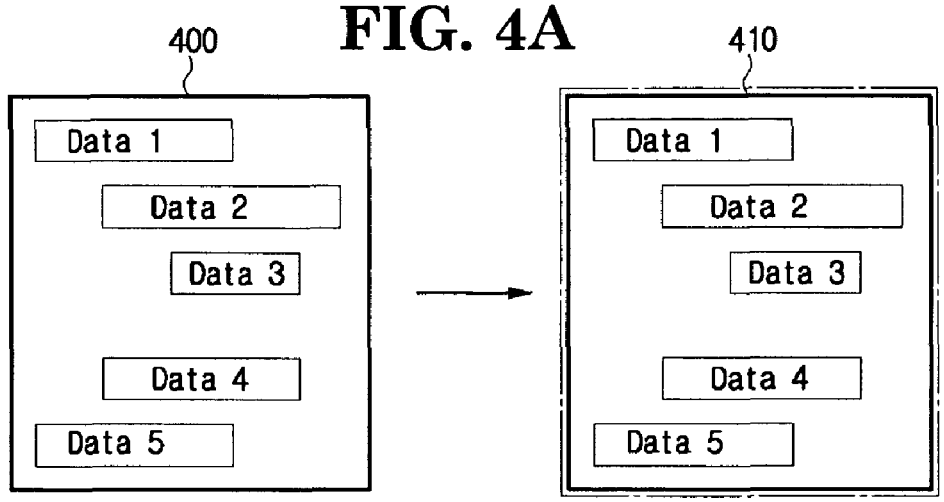
FIGS. 4A, 4B, and 4C are views showing examples of selecting a print area according to an embodiment of the present invention.
Figure 4B:
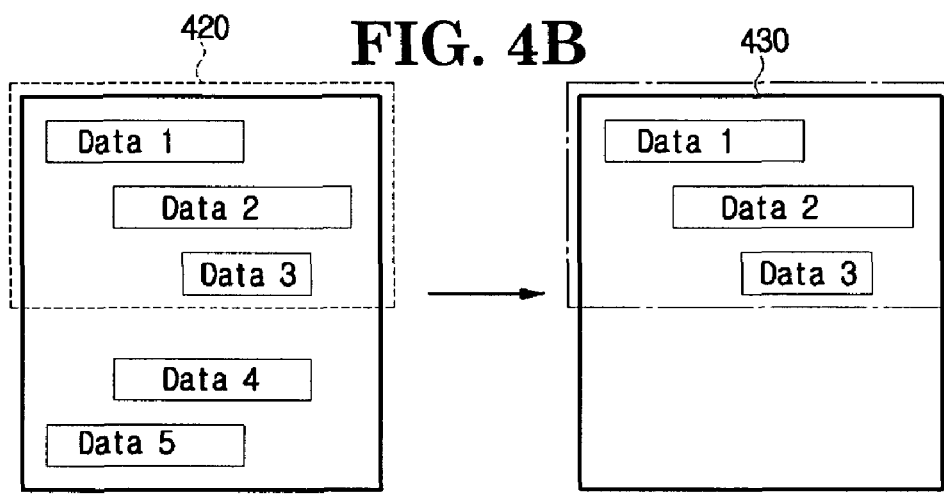
Figure 4C:
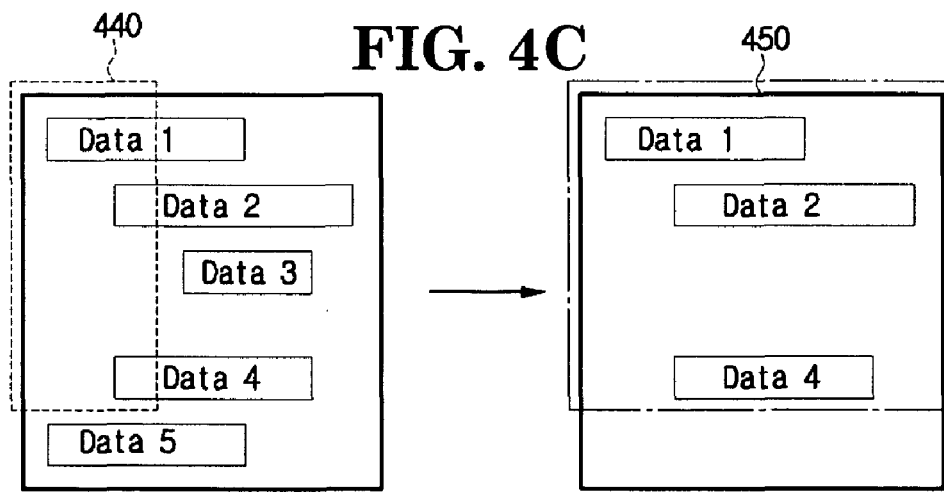

FIGS. 4A-4C are views showing examples of selecting print areas according to embodiments of the present invention. A detailed description of the operation S100 of selecting print areas with reference to FIGS. 4A-4C follows.

In FIGS. 4A, 4B, and 4C, the views on the left illustrate previews, and those on the right illustrate print areas selected by the dotted-line borders on the left. The print areas selected are searched for blank areas as described above.

In an embodiment the display visually provides a user with the views, such as those on the left in FIGS. 4A-4C, for the print area selections, which enables the user to visually and conveniently select a print area. The views on the right in FIGS. 4A-4C do not have to be visually provided to a user, but are displayed here for conceptually showing the selected print area for a convenient explanation of an embodiment. However, the views on the right can be visually provided to a user as well.

FIG. 4A is a view showing that one entire page is selected as a print area. A user can select the print area shown in the view on the right side, using a selection option or a mouse, arrow keys, a keyboard, a touch screen, a remote controller, etc., enabling the user to select the print area while looking at the preview on the left.

Figure 3B:
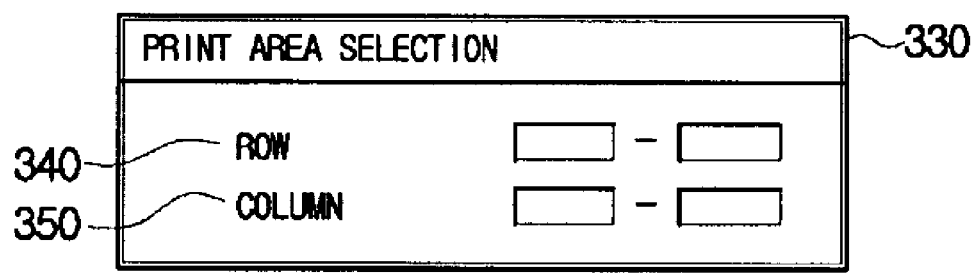

As an embodiment of the invention, FIG. 3B shows a selection menu enabling a user to select the print area. The print area selected as shown on the right view of FIG. 4A can be accomplished on the selection menu shown in FIG. 3B or by a mouse, arrow keys, touch screen, remote controller, etc. If a user intends to select a print area with a mouse, the user drags the mouse over the entire page all the way through. FIG. 4A shows an example of the print area selected through the selection menu shown in FIG. 3B. In this instance, the print area is indicated in the single-dot dashed border on the right side of FIG. 4A for convenience. The operation S110 is carried out over the area enclosed in the single-dot dashed border to check whether blank areas exist.

FIG. 4B shows that part of a page is selected as a print area by the dotted-line border. In this case, it is assumed that a user uses a mouse to select a print area, however, it is understood that a user interface as described above such as keyboard arrows, cursor keys, touch screen, remote controller or other input device could be used. As shown in the left view in FIG. 4B, the user can drag the mouse over a preview to select a print area. FIG. 4B shows the dragged area in the dotted-line border. The dragged area corresponds to a print area as shown in the single-dot dashed border in the right view of FIG. 4B.

In general, users cannot select a print area from a preview screen offered by application programs directly using a mouse or other input device, because the previews offered by the application programs do not support such a designation of a specific print area. Accordingly, the print area can only be selected after the preview is converted to an active status (or mode) enabling users to designate the print area.

The conversion to the active status (hereinafter, referred to as 'print area selection mode') enabling users to select a print area can be made on a selection bar shown in FIG. 3A, for example. If a user intends to make the conversion to the print area selection mode on the selection bar of FIG. 3A, the user selects the option box for "Blank Line Skip" and presses the Enter button (such as an enter key on a keyboard or apply button in the interface) to convert the mode to the print area selection mode. In the print area selection mode, the user can select a print area with a mouse or other input device.

In another embodiment of the invention, on the selection bar of FIG. 3A, the user specifies pages 2-3 and selects the box for "Blank Line Skip", which enables the entire content of pages 2-3 to be selected as a print area. In such circumstances, the user can convert to the print area selection mode at the same time as selecting a print area.

In another embodiment of the invention, if a user specifies the current page as the "Print Range" and checks the box for "Blank Line Skip" on the selection menu of FIG. 3A, the selection menu of FIG. 3B is subsequently provided. At the user's option, part of the current page can be selected as a print area by specifying columns and rows on the selection menu of FIG. 3B.

In an embodiment of the invention, a user can select a print area as shown in the right view of FIG. 4B, by dragging a specific area with a mouse (or other input device) as shown in the left view of FIG. 4B. The print area selected this way is conceptually shown in the right view. The right view shows the print area in a single-dot dashed border. The embodiment shows that the dragged area is the same as a print area. The term "dragged area" used in the disclosure refers to an area designated (enclosed in a dotted-line border) by a mouse (or other input device) as shown in the left views of FIGS. 4B and 4C.

In an embodiment of the invention, when a user presses one button of a mouse, for example, the right button, while dragging as shown on the left view of FIG. 4B, with another button pressed, for example, the left button of the mouse, the embodiment provides the user with a window (not shown) on which the user can input a print command. When the user inputs the print command in the window, the S110 and S120 operations are continuously carried out so that print operations are performed.

FIG. 4C shows views of selecting part of a page as a print area, as another embodiment.

FIG. 4C shows an example of a print area selected by a mouse (or other input device), in which a dragged area does not correspond to a full print area when the left view of FIG. 4C is referred to.

The part enclosed in the dotted-line border corresponding to the dragged area when a mouse is dragged as shown on the left view, translates to a print area enclosed in the single-dot dashed border as shown on the right view.

Specifically, if a mouse is dragged as shown in FIG. 4C and part or all of a data line is enclosed in the mouse-dragged area, all of the data line is selected for the print area. For example, even though front parts of lines of data 2 are enclosed in a dragged area 440, a print area is selected to enclose all of the lines of data 2. Although the data (such as data 2) is described as lines of data, it is understood that the data includes strings and blocks of data such as text, figures, or images.

In the embodiment shown in FIG. 4C, the mouse-dragged area itself does not mean a print area, that is, an embodiment of the invention checks that the mouse-dragged area encloses at least part of data lines, and only when the dragged area encloses part of the data lines, are the data lines included in the print area. For example, in FIG. 4C a dragged area includes parts of lines of data 1, data 2, and data 4 but not data 3, so all the lines of data 1, data 2, and data 4 are included in a print area as shown on the right view. That is, the remainder part of a data block partially outside the selected area will be included in the selected print area. Although the mouse-dragged area encloses front parts of data in this example, the invention is not limited thereto. That is, data blocks with other parts of data such as top, side, or bottom, that are within the dragged area are included in the corresponding print area. Next, a search is performed to check whether blank areas exist in the selected print area (S110), that is, in the areas enclosed in the single-dot dashed borders on the right side of FIGS. 4A-4C.

Figure 5A:
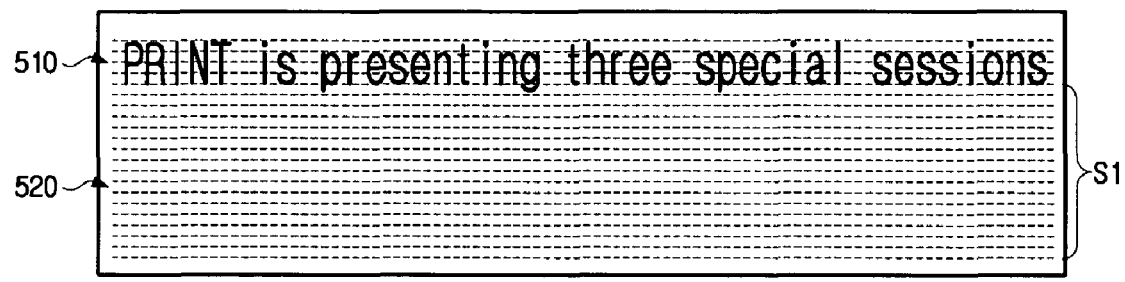
FIGS. 5A and 5B are views describing a method for searching for blank areas according to an embodiment of the present invention.
Figure 5B:
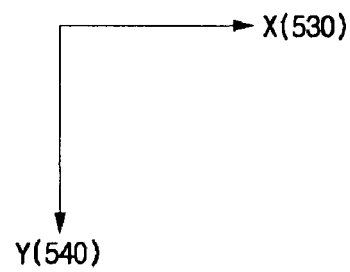

FIGS. 5A and 5B are views for describing a method of searching for blank areas according to an embodiment of the present invention. The operation S110 of searching for blank areas is now described with reference to FIGS. 5A and 5B.

FIG. 5A shows an area selected as a print area. Dashed lines are additionally shown for convenient explanation. FIG. 5B shows the search directions X (530) and Y (540).

The operation S110 of searching for blank areas searches the blank areas on every dashed line. That is, the operation S110 searches dashed lines 510 and 520 in the X direction 530 from the first dash to the last dash, and, if no data exists, determines that the dashed line is a blank area. In FIG. 5A, there exists data on the dashed lines designated 510. However, there exists no data on the dashed lines designated 520, so the lines 520 become a blank area.

The blank area refers to an area with no data existing for printout. In the present embodiment, a size of a blank area can be defined in units of dashed lines. For example, the size of a blank area S1 in FIG. 5A can be indicated as 16. Alternatively, the size of a blank area can be indicated in units of text lines. The present embodiment shows, for convenient explanation, that a text line is formed with four dashed lines. In such a formation, the size of the blank area S1 can be indicated as 4 if indicated with units of text lines.

Next, the operation S120 prints the selected print area, having the size of the searched blank areas turned into a predetermined size. The readability of a document is impaired if all the blank areas are removed for printout, so it is desirable to secure blank areas larger than a predetermined size. To do so, a user can set the size of the blank area in advance. The user can set the size of the blank area in units of text lines or dashed lines depending on embodiments. It is understood that the predetermined size can also be a predetermined data value such as a gird line or other marker indicator and that the user can set the predetermined marker.

In an embodiment, the user can set the size of a blank area depending on the font size of text to be printed. To do so, the user can set default values of blank area sizes depending on font sizes. It is known by one of skill in the art how to set such default values without undue trial and error.

Figure 6:
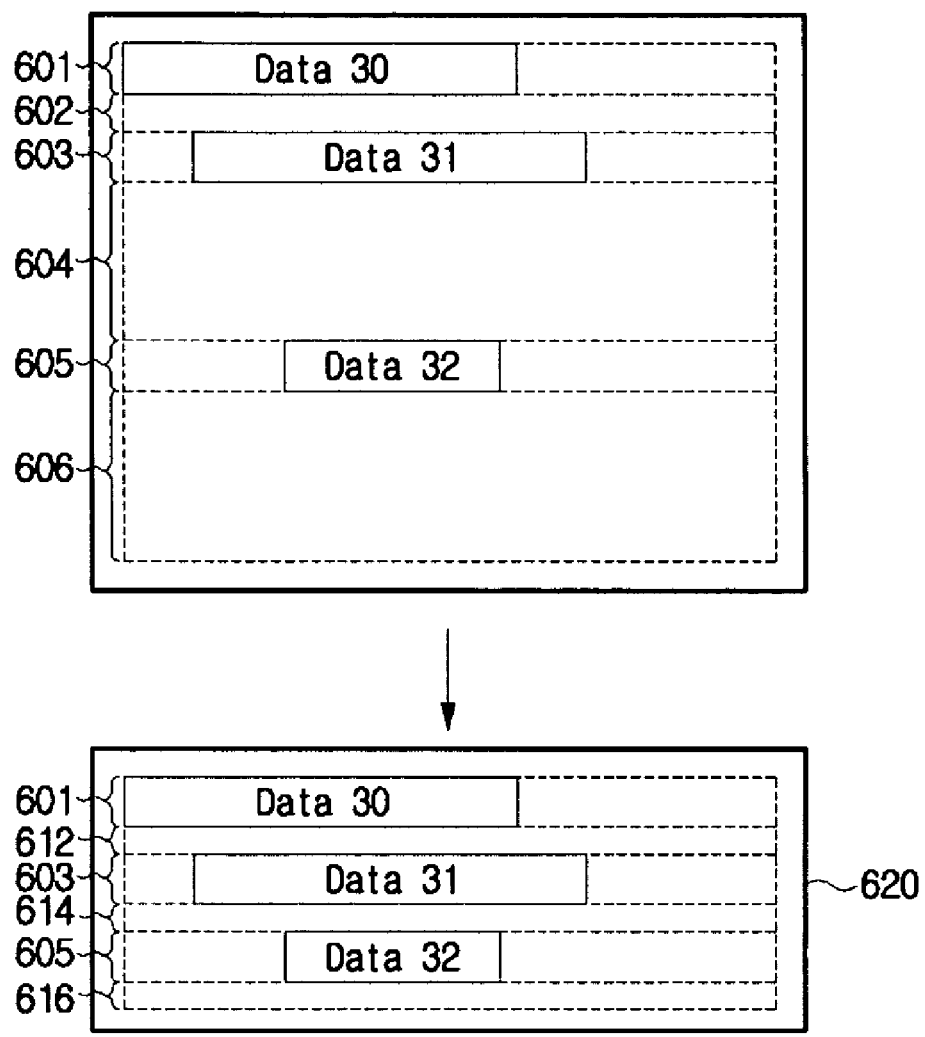
FIG. 6 is a view for describing selected print areas according to an embodiment of the present invention.

FIG. 6 is a view describing a printout view of a print area according to an embodiment of the present invention. The operation S120 is described in more detail with reference to FIG. 6 as follows.

The upper view in FIG. 6 indicates a selected print area. In such a print area, the blank size existing between data 31 and data 32 is considerably broad, and the blank area below the data 32 is also considerably broad.

In an embodiment of the invention, a user can reduce the size of and print the blank areas as shown in the lower view of FIG. 6. To do so, the user can set a size of the blank areas in advance as shown in the lower view of FIG. 6, and perform the conversion and print operation S120. Therefore, the user can remove unnecessary space so as to save paper for printout.

Alternatively, if the readability is degraded because the size of a blank area existing in a print area is too small, the user can increase the size of the blank area for printout.

According to an embodiment, the present invention enables the user to set to a predetermined value the size of blank areas between lines of data existing on plural pages. To do so, the user can designate plural pages as a print area, set the size of blank areas to a single suitable size in advance, and print the print area.

FIG. 2 is a flow chart describing a document print method according to another embodiment of the present invention.

Referring to FIG. 2, a print preview displays in advance the document printout preview on a screen S200. In general, the document printout preview S200 is a function that applications for editing documents offer, wherein the applications can be Hangeul, Hunminjeongeum, Microsoft Word®, Corel WordPerfect®, Microsoft PowerPoint® and so on, for example. Alternatively, the document printout preview can be a preview offered by a preview viewer 730 which will be described later.

While viewing the print preview display, a print area is set S210. On the preview offered in S200, a user first changes modes to a print area selection mode allowing the user to select a print area, and then selects a print area, or the user can select a print area at the same time as changing modes to the print area selection mode.

For the change into the print area selection mode, a selection menu shown in FIG. 3A can be provided to the user. A user can check the box for "Blank Line Skip" to change modes to the print area selection mode. The user can perform the mode change into the print area selection mode and the selection of a print area at the same time, by checking the box for "Blank Line Skip" and specifying pages, for example, pages 2-3.

FIGS. 3A and 3B are views showing a print area selection method according to an embodiment of the present invention. In FIG. 3A, a user selects an entire document, or an entire page, a range of pages and/or a part of a page of a document for printout (310), and then can select whether to remove blank areas according to a print method of the present invention (320).

In an alternate embodiment, the user can select a print area by dragging a mouse (or using another input device such as a touch screen or arrow keys on a keyboard) over a screen view changed into the print area selection mode. Further, the user can select a predetermined area as a print area by inputting setting values to specify a print area, for example, inputting row values 340 and column values 350. The user need only input the row values 340 or only the column values 350, if desired. For example, if the user can specify a page range (G) as 5-5 or check the current page together with "Blank Line Skip" checked and apply the selection by pressing the Enter button or other way such as clicking on an "apply" choice, or double clicking "Blank Line Skip," a print area selection menu shown in FIG. 3B appears. In this case, if the user presses the Enter button with no inputs of row and column values, the specified page range (G) of 5-5 or the current page is selected as a print area. The term used in the present disclosure of "to specify a print area" refers to an operation that can define a specific area of a document, such as rows, columns, and pages.

An operation S220 searches the selected print area for blank areas. The search method is conducted as described above with reference to FIGS. 5A and 5B.

An operation S230 stores the print area with the size of the searched blank areas having a predetermined size, which is to secure space between lines by the predetermined size for the readability of a document as described in S120. The aforementioned description with reference to FIG. 6 of replacing blank areas in the selected print area can be applied to securing space between lines in the stored printed area. By storing the print area obtained after replacing the blank areas in the selected print area, the user can recall the document for use in the stored format (620) after the printout.

Following storage of the print area with the size of the searched blank areas converted into a predetermined size, a printout preview of the stored print area is displayed on the screen S240. This display of the preview of the selected print area without blank areas on the screen permits the user to decide whether to print the print area. Although the present embodiments indicate the print previews are displayed on a screen, it is understood other display devices can be used.

Figure 9:
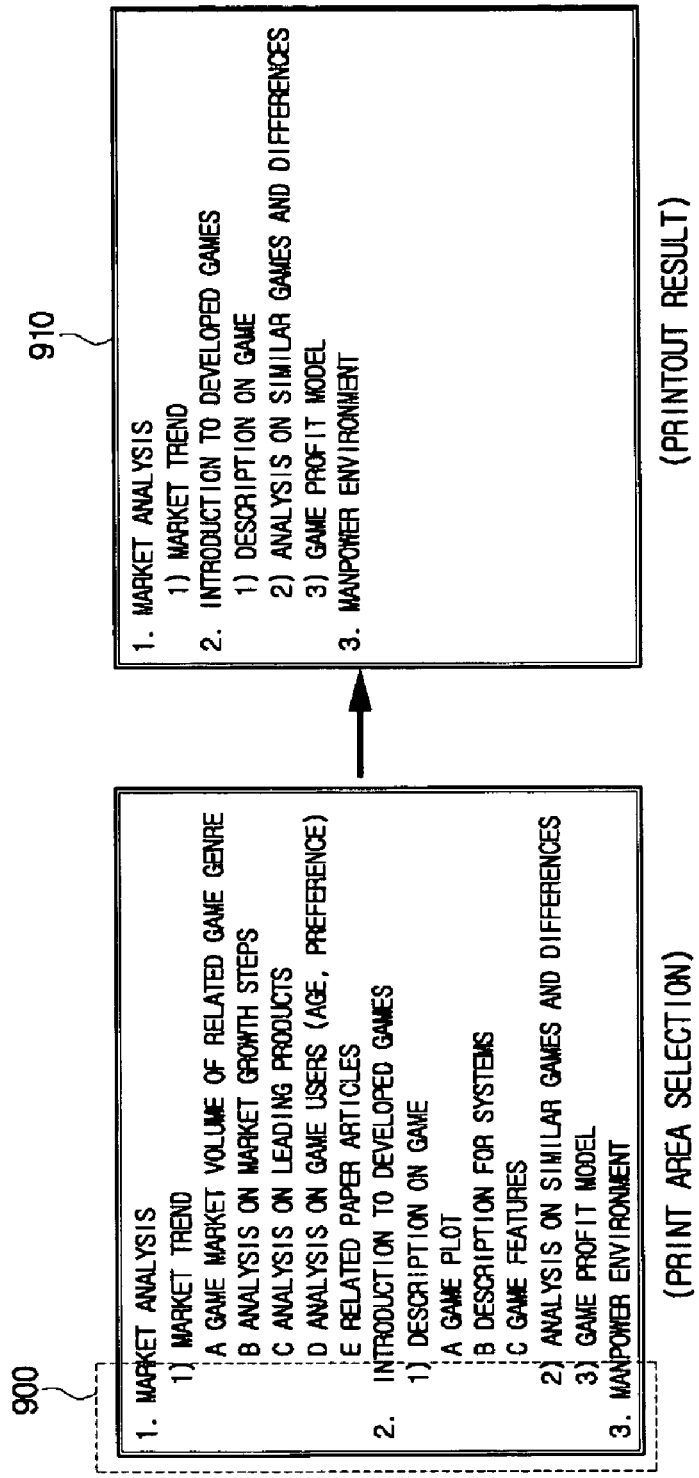
FIG. 9 is a view for showing a printout result according to an embodiment of the present invention.

An operation S250 then prints out the stored print area. FIG. 9 is a view showing a printout result according to an embodiment of the present invention. In FIG. 9, if a part 900 is specified by mouse drag or by row and column inputs, a printout result 910 can be obtained which lists the content titles of a document with blank areas removed. Therefore, the user can improve the printout efficiency, printing the document in content titles with no need to directly edit the document, and the user can use the content titles in the stored format having the searched blank areas converted to a predetermined size S230.

Figure 7:
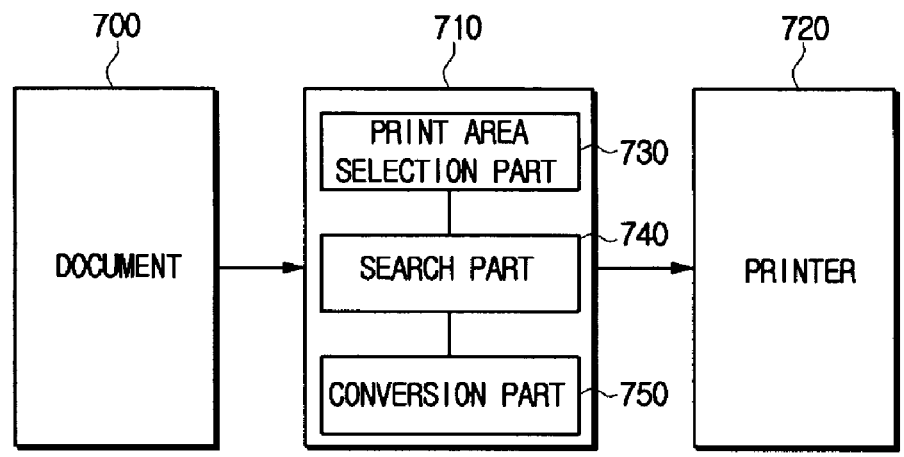
FIG. 7 is a block diagram for showing a structure of a print system according to an embodiment of the present invention.

FIG. 7 is a block diagram showing a structure of a print system according to an embodiment of the present invention. The print system includes a printer driver 710 and a printer 720.

A document 700 is created with a certain application program. The printer driver 710 includes a print area selection part 730, a search part 740, and a conversion part 750. The print area selection part 730 selects a print area to be printed out of the document 700. The entire document, pages, or parts of pages of the document can be selected as a print area, where a print area can be selected on a certain page by mouse drag (or other input device such as touch screen, remote controller or keyboard arrow keys) or by option values, for example, row and column values, for specifying the print area.

The search part 740 searches the print area selected by the print area selection part 730 for blank areas. In FIGS. 5A and 5B, the search part 740 searches the dashed lines 510 and 520, each of which is the minimum unit for searching for blank areas, from the first dash to the last dash in the X direction 530, and, if there is no data, determines that the searched area is a blank area. For example, the dashed line 520 can be a blank area. Upon the search for blank areas, the search part 740 searches the area selected as the print area by the print area selection part 730 from the first dash to the last dash of every dashed line. It is understood that once the search part 740 detects data on a dashed line in the print area it need not continue searching that dashed line for blank areas.

The conversion part 750 converts the print area, having the size of searched blank areas turned into a predetermined size. A user can input the predetermined size to secure space between lines. The conversion part 750 converts the print area, using the default values stored in advance, if no values are input by the user. If the dashed lines determined as blank areas form the areas 602, 604, and 606 shown in FIG. 6 during continuous searches in the Y direction 540 of FIG. 5B, printout is performed with the predetermined size substituted for 602, 604, and 606 at 612, 614, and 616, respectively. Thus, only the parts 601, 603, and 605 having data for printout are printed with the readability of the document maintained, which can reduce the number of printout pages.

The printer 720 prints the print area converted by the conversion part 750. While the embodiments describe the printing apparatus as a printer, it is understood other printing apparatus can be used to print such as a copy machine, a facsimile, a web site, etc. and printing can be local and remote.

Figure 8:
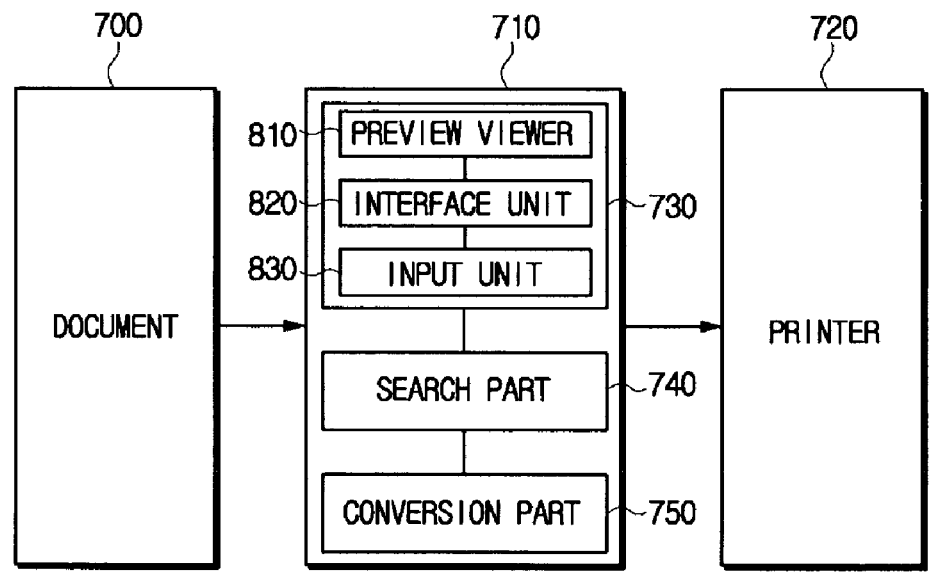
FIG. 8 is a block diagram for showing a structure of a print system according to another embodiment of the present invention.

FIG. 8 is a block diagram showing a structure of a print system according to another embodiment of the present invention. In contrast to FIG. 7, the print area selection part 730 has a preview viewer 810, an interface unit 820, and an input unit 830.

The preview viewer 810 displays a printout preview of the document 700 on the screen or other display device. The preview is not provided by an application program for documents, but provided to a user by the print area selection part 730 depending upon the kind of document.

The interface unit 820 is a user interface unit enabling the user to select a print area to be printed out of a document while looking at the view created by the preview viewer 810. As described above, users can select as a print area the entire document, or entire pages, ranges of pages and/or parts of pages of the document as well as a part of a page of the document by mouse or other input device drag over the page or by option value inputs, for example, row and column value inputs, for specifying the print area.

The user can input a size of a blank area to secure space between data lines through the input unit 830, which is to printout the print area with the designated space between the data lines with a predetermined size to maintain the readability of the document.

As described above, the search part 740 searches the print area selected by the print area selection part 730 for blank areas, and the conversion part 750 converts the print area, having the size of searched blank areas turned into the predetermined size. The printer 720 prints the print area converted by the conversion part 750.

As aforementioned, the present invention can reduce the number of pages for printout, printing only parts on which there are data for printout, improve readability, or facilitate data comparison with other documents. Further, the present invention increases user's satisfaction, printing only content titles contained in a document depending on the user's option. While not required in all aspects, portions of the method can be implemented using computer software and/or firmware encoded on one or more computer readable media to be implemented on one or more computers.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A print method, comprising:
   selecting a print area for printout from an area within a print preview of a document which is a printable file created with an application;
   searching the selected print area for blank areas; and
   printing the selected print area using a printer,
   wherein the searched blank areas are turned into markers of a predetermined size set by a user prior to printing,
   wherein the blank areas are areas having no data among data for printout,
   wherein printing the selected print area comprises printing on a printable medium only parts on which there are data for printout whereby a final print size is reduced in comparison to an initial print size; and
   wherein when the selected print area of a document includes part of a data line and a remainder of the data line is outside the selected print area, the printout of the selected area will include data that was outside of the selected print area.

2. The print method as claimed in claim 1, wherein the selecting of the print area includes:
   displaying on a screen a document printout preview to a user; and
   providing a print area selector in order for the user to select the print area while looking at the screen.

3. The print method as claimed in claim 2, wherein the selecting of the print area further includes inputting the predetermined size.

4. The print method as claimed in claim 2, wherein the print area selector is an input window for inputting option values for specifying the print area, and an area defined by the option values is selected as the print area.

5. The print method as claimed in claim 1, wherein the printing includes:
   storing the selected print area, having the size of the searched blank areas turned into the predetermined size; and
   printing the stored print area.

6. The print method as claimed in claim 5, wherein the printing includes displaying a printout preview of the stored print area before printing the stored print area.

7. The print method as claimed in claim 5, wherein the printing includes sending the stored print area to a remote computer over a network.

8. A print system, comprising:
   a print area selection part to select a print area to be printed out of a print preview of a document which is a printable file created with an application;
   wherein the selected area is selected from a area within the print preview of the document;
   a search part to search the selected print area for blank areas;
   a printer driver having a conversion part to convert the print area, the searched blank areas being turned into markers of a predetermined size by the conversion part; and
   a printer to print the print area converted by the conversion part,
   wherein the blank areas are areas having no data among data for printout,
   wherein the converted print area comprises printing on a printable medium only parts on which there are data for printout whereby a final size is reduced in comparison to an initial print size; and
   wherein when the selected print area of a document includes part of a data line and a remainder of the data line is outside the selected print area, the printout of the selected area will include data that was outside of the selected print area.

9. The print system as claimed in claim 8, wherein the printer is a remote or virtual printer on a network.

10. The print system as claimed in claim 8, wherein the print area selection part includes:
    a preview viewer to display a document printout preview to a user on a screen; and
    a selection part to provide a print area selector enabling the user to select the print area while looking at the screen.

11. The print system as claimed in claim 10, wherein the print area selection part includes an input part to input the predetermined size.

12. The print system as claimed in claim 10, wherein the print area selector is an input window to input option values to specify the print area wherein an area defined by the option values is selected as the print area.

* * * * *